US008880899B1

(12) United States Patent
Ioffe

(10) Patent No.: US 8,880,899 B1
(45) Date of Patent: Nov. 4, 2014

(54) SYSTEMS AND METHODS FOR FACILITATING FLIP-RESISTANT MEDIA FINGERPRINTING

(75) Inventor: Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/457,472

(22) Filed: Apr. 26, 2012

(51) Int. Cl.
*G06F 11/30* (2006.01)

(52) U.S. Cl.
USPC .......................................... 713/189

(58) Field of Classification Search
CPC .......... G06F 21/72; G06F 21/10; G06F 11/30
USPC ............................. 713/189; 382/217; 707/698
See application file for complete search history.

(56) References Cited

U.S. PATENT DOCUMENTS

| 8,233,722 | B2 * | 7/2012 | Kletter et al. | 382/217 |
| 8,364,703 | B2 * | 1/2013 | Ramanathan et al. | 707/769 |
| 8,406,456 | B2 * | 3/2013 | More | 382/100 |
| 2008/0028439 | A1 * | 1/2008 | Shevade | 726/3 |
| 2009/0324199 | A1 * | 12/2009 | Haitsma et al. | 386/95 |
| 2010/0325117 | A1 * | 12/2010 | Sharma | 707/753 |
| 2011/0247042 | A1 * | 10/2011 | Mallinson | 725/86 |
| 2013/0179452 | A1 * | 7/2013 | Ramanathan et al. | 707/747 |

OTHER PUBLICATIONS

Regunathan Radhakrishnan, On Improving the Collision Property of Robust Hashing Based on Projections, Publication year: 2009, pp. 862-865, IEEE.*
Laimer Gerold, Key-dependent JPEG2000-based robust hashing for secure image authentication, Jan. 2008, ACM.*
Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by/020Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.
Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

* cited by examiner

*Primary Examiner* — Luu Pham
*Assistant Examiner* — Gita Faramarzi
(74) *Attorney, Agent, or Firm* — Amin, Turocy & Watson, LLP

(57) ABSTRACT

Systems and methods for facilitating media fingerprinting are provided. In one aspect, a system can include: a memory, a microprocessor, a communication component that receives media; and a media fingerprinting component that fingerprints the media. The media fingerprinting component employs a fingerprint generation component stored in the memory and includes: a first hash generation component that generates sets of hashes corresponding to versions of the media; and a second hash generation component that computes a final hash based, at least, on hashing the sets of hashes. In some aspects, the media fingerprinting component can generate a flip-resistant fingerprint based, at least, on the final hash. In some aspects, the flip-resistant fingerprint is the final hash.

23 Claims, 7 Drawing Sheets

SYSTEMS AND METHODS FOR FACILITATING FLIP-RESISTANT MEDIA FINGERPRINTING

TECHNICAL FIELD

This disclosure generally relates to flip-resistant media fingerprinting.

BACKGROUND

Conventional media processing methods employ media fingerprinting to identify near-duplicate media, and/or portions thereof. However, many media fingerprinting systems and/or methods produce hashes that are dependent on the orientation of the media. As such, flipping the media vertically or horizontally may prevent a hash associated with the fingerprint from matching duplicate or near duplicate media. Because flipped versions of media can be viewed on devices (e.g., mobile devices), fingerprints (and/or hashes associated with fingerprints) that are ineffective against flipped versions of media can be problematic. As such, systems and methods that provide approaches for generating flip-resistant media fingerprints are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one or more aspects, a system that performs media fingerprinting can include: a memory that stores computer executable components; and a microprocessor that executes computer executable components stored in the memory. The computer executable components can include: a communication component that receives the media; and a media fingerprinting component that fingerprints the media. The media fingerprinting component can employ a flip-resistant fingerprint generation component stored in the memory and include: a first hash generation component that generates sets of hashes corresponding to respective versions of the media, the sets of hashes including respective sets of hash values; and a second hash generation component that computes a final hash based, at least, on hashing the sets of hashes, and generates a flip-resistant fingerprint based, at least, on the final hash.

In one or more aspects, a system that performs media fingerprinting can include: a memory that stores computer executable components; and a microprocessor that executes computer executable components stored in the memory. The computer executable components can include: a media fingerprinting component that fingerprints the media. The media fingerprinting component can employ a flip-resistant fingerprint generation component stored in the memory and include: a first hash generation component that generates sets of hashes corresponding to respective versions of the media, the sets of hashes including respective sets of hash values; and a second hash generation component that computes a final hash based, at least, on hashing the group of hash values, and generates a flip-resistant fingerprint based, at least, on the final hash.

In one or more aspects, a method that performs media fingerprinting can include employing a microprocessor to execute computer executable components stored within a memory to perform the following: generating sets of hashes corresponding to respective versions of the media, the sets of hashes including respective sets of hash values; and computing a final hash based, at least, on hashing the group of hash values; and generating a flip-resistant fingerprint based, at least, on the final hash In one or more aspects, another method that performs media fingerprinting can include employing a microprocessor to execute computer executable components stored within a memory to perform the following: generating sets of hashes corresponding to respective versions of media, the sets of hashes including respective sets of hash values; computing a final hash based, at least, on hashing the sets of hashes; and generating the flip-resistant fingerprint based, at least, on the final hash.

In one or more aspects, another system that performs media fingerprinting can include: a memory that stores computer executable components; and a microprocessor that executes computer executable components stored in the memory. The computer executable components can include: a communication component that receives the media; and a media fingerprinting component that fingerprints the media. The media fingerprinting component can employ a flip-resistant fingerprint generation component stored in the memory and include: a first hash generation component that generates sets of hashes corresponding to respective versions of the media, the sets of hashes including respective sets of hash values; a sorting component that determines information corresponding to one or more positions of the one or more hash values, and generates sorted sets of hashes; and a second hash generation component that computes a final hash based, at least, on the sorted sets of hashes, and generates a flip-resistant fingerprint based, at least, on the final hash.

In one or more aspects, another method that performs media fingerprinting can include employing a microprocessor to execute computer executable components stored within a memory to perform the following: receiving media; and generating a flip resistant fingerprint for the media, wherein the generating includes: generating sets of hashes corresponding to respective versions of the media, the sets of hashes including respective sets of hash values; determining information corresponding to one or more positions of the one or more hash values; generating sorted sets of hashes; computing a final hash based, at least, on the sorted sets of hashes; and generating a flip-resistant fingerprint based, at least, on the final hash.

Toward the accomplishment of the foregoing and related ends, the one or more aspects include the features hereinafter fully described and particularly pointed out in the claims. The following description and the annexed drawings set forth herein detail certain illustrative aspects of the one or more aspects. These aspects are indicative, however, of but a few of the various ways in which the principles of various aspects can be employed, and the described aspects are intended to include all such aspects and their equivalents.

DETAILED DESCRIPTION

Figure 1:
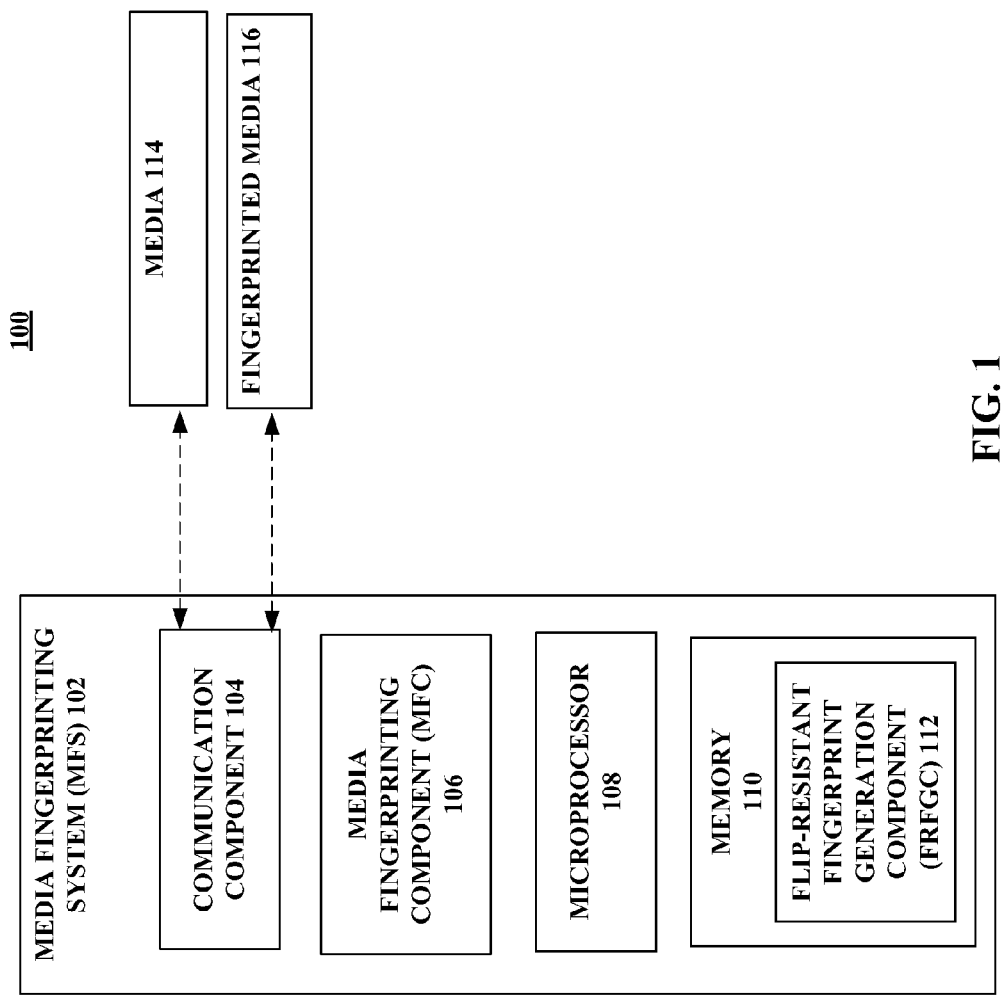
FIG. 1 is an illustration of a block diagram of an exemplary non-limiting media fingerprinting system that facilitates flip-resistant media fingerprinting in accordance with one or more aspects described herein.

Various aspects are now described with reference to the drawings, wherein like reference numerals are used to refer to like elements throughout. In the following description, for purposes of explanation, numerous specific details are set forth in order to provide a more thorough understanding of one or more aspects. It is be evident, however, that such aspects can be practiced without these specific details. In other instances, structures and devices are shown in block diagram form in order to facilitate describing one or more aspects.

Systems and methods disclosed herein relate to generating flip-resistant media fingerprinting. As used herein, the term "flip-resistant" can mean independent of the orientation of the media. In some aspects, a system that generates a flip-resistant media fingerprint can include: a communication component that receives the media; and a media fingerprinting component that fingerprints the media. The media fingerprinting component can employ a flip-resistant fingerprint generation component stored in the memory. The flip-resistant fingerprint generation component (FRFGC) can include a first hash generation component that generates sets of hashes corresponding to respective versions of the media. The sets of hashes can include respective sets of hash values. The FRFGC can also include a hash augmentation component that associates one or more of the hash values with an index value indicative of a position of the hash values within the sets of hash values. The FRFGC can also include a hash aggregation component that obtains pairs of the hash values and corresponding index values. The FRFGC can also include a second hash generation component that computes a final hash based, at least, on hashing the sets of hashes, and generates a flip-resistant fingerprint based, at least, on the final hash.

The systems and methods herein can advantageously provide media fingerprinting and corresponding matching between media (e.g., image and video media) that is independent of the orientation of the media. For example, media received and/or previously-stored can be fingerprinted with a fingerprint independent of whether the media is the original version (e.g., orientation) of the media, a horizontally, vertically and/or diagonally flipped version of the media.

FIG. 1 is an illustration of a block diagram of an exemplary non-limiting media fingerprinting system that facilitates flip-resistant media fingerprinting in accordance with aspects described herein. The system (e.g., system 100) can include a media fingerprinting system (MFS) 102 that can include a communication component 104, a media fingerprinting component (MFC) 106, a microprocessor 108 and/or a memory 110. In some aspects, system 100 can also include media 114 and/or fingerprinted media 116. The communication component 104, MFC 106, microprocessor 108 and/or memory 110 can be electrically and/or communicatively coupled to one another to perform one or more functions of the system 100 described in this disclosure.

The communication component 104 can receive media 114 (e.g., media and/or image), or a portion thereof. The communication component 104 can also output fingerprinted media 116, as shown in FIG. 1. The fingerprinted media 116 can include, and/or be associated with, a fingerprint. In some aspects, the communication component 104 can output fingerprinted media 116 and/or a fingerprint for the received media 114. In various aspects, the communication component 104 can access media stored at the memory 110 of the MFS 102 and/or stored at a location remote from the MFS 102. For example, the communication component 104 can access the media 114 over a network (not shown) including, but not limited to, the internet.

The MFC 106 can fingerprint the media with a generated fingerprint. In various aspects, for example, the MFC 106 can employ the flip-resistant fingerprint generation component (FRFGC) 112 stored in the memory 110 to generate the flip-resistant fingerprint with which the media (or a portion thereof) is fingerprinted.

In various aspects, the flip-resistant fingerprint can be generated based on hashes in some aspects. The FRFGC 112 can be described in greater detail with reference to FIG. 2.

Microprocessor 108 can perform one or more of the functions described in this disclosure with reference to any of the systems and/or methods disclosed.

The memory 110 can be a computer-readable storage medium storing computer-executable instructions and/or information for performing the functions described in this disclosure with reference to any of the systems and/or methods disclosed. For example, as shown, memory 110 can store computer-executable instructions in some aspects, for performing the functions of the fingerprint generation component 112.

Figure 2:
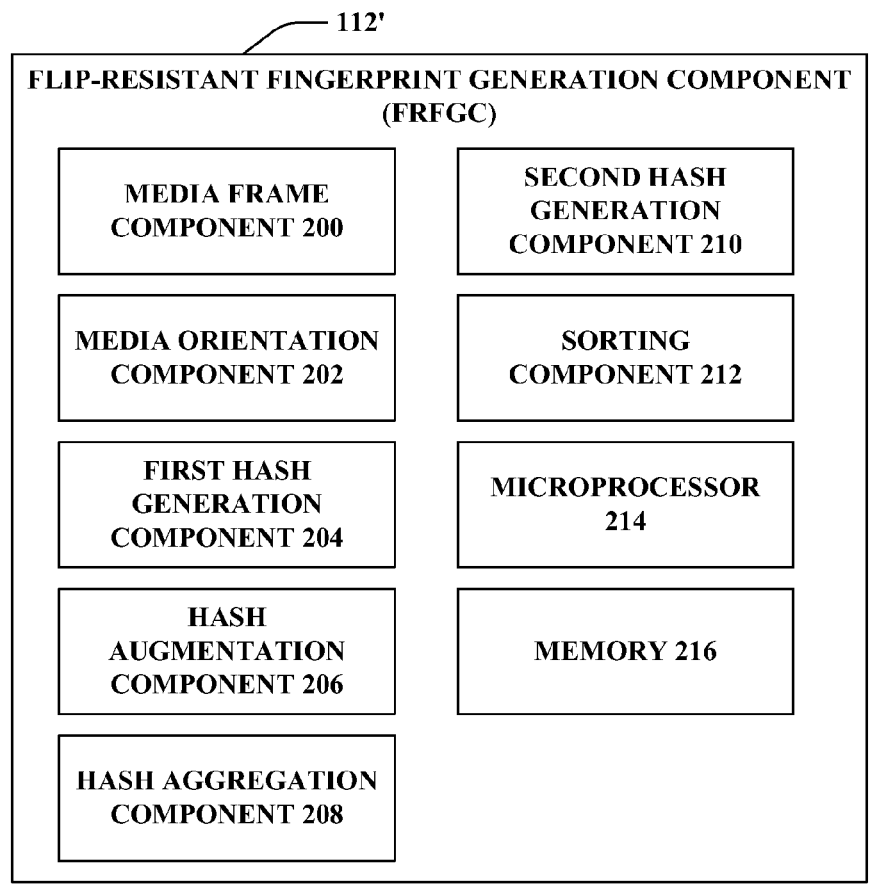
FIG. 2 is an illustration of a block diagram of an exemplary non-limiting fingerprint generation component that facilitates flip-resistant media fingerprinting in accordance with one or more aspects described herein.

FIG. 2 is an illustration of a block diagram of an exemplary non-limiting fingerprint generation component (FRFGC 112') that facilitates flip-resistant media fingerprinting in accordance with aspects described herein. The FRFGC 112 of FIG. 1 can be described in greater detail with reference to FIG. 2. As such, one or more of the structure and/or functions of the FRFGC 112 can be as described and/or shown with reference to the FRFGC 112' of FIG. 2.

As shown in FIG. 2, the FRFGC 112' can include a media frame component 200, a media orientation component 202, a first hash generation component (FHGC) 204, a hash augmentation component 206, a hash aggregation component 208, a second hash generation component (SHGC) 210, a sorting component 212, a microprocessor 214 and/or a memory 216. In various aspects, one or more of the media frame component 200, media orientation component 202, FHGC 204, hash augmentation component 206, hash aggregation component 208, SHGC 210, sorting component 212, microprocessor 214 and/or memory 216 can be electrically and/or communicatively coupled to one another to perform one or more of the functions of FRFGC 112 and/or FRFGC 112'.

The FRFGC 112' can receive frame information for media. In various aspects, the frame information can include information about the content of the corresponding frame of media. In some aspects, the frame information can include information associated with the content of an average of two or more frames. The media frame component 200 can determine and/or generate a frame of media.

In some aspects, the media orientation component 202 can determine the orientation of media received at the FRFGC 112'. In various aspects, the media orientation component 202 can modify the orientation of media received at the FRFGC 112'. For example, in various aspects, the media orientation component 202 can modify the orientation of the media to a horizontally, vertically and/or diagonally flipped version of the media.

In some aspects, the FHGC 204 generates hashes. Each hash can correspond to a version (e.g., orientation) of the media. By way of example, but not limitation, the FHGC 204 can generate at least one hash for each orientation of the media. As such, the media orientation component 202 can modify media received such that the media is a different orientation from the orientation in which the media was received.

The FHGC 204 can generate a hash describing the content of the media. For example, in some aspects, the FHGC 204 can generate a hash of a selected number of hash values. The hash values can represent the content of various portions of media (or a frame thereof). The hash values can be represented in any number of different forms including, but not limited to, integers, values between 0 and 155, strings or the like.

In some aspects, the FHGC 204 can generate a number of hashes for the same version of the media. In these aspects, the FHGC 204 can generate a number of hashes that is greater than the number of orientations than the media orientation component 202 generates.

The hash augmentation component 206 can augment and/or associate each hash value with an index value. The index value can be indicative of a position of the hash value within a hash. For example, for a hash having 100 hash values, the index value can take on a value indicating whether a hash value is the first hash value within the hash, the second hash value or the last (e.g., $100^{th}$) hash value within the hash.

In various aspects, if memory space allocated for a hash is large enough, the corresponding index values can be stored with the hash values of the hash.

The hash aggregation component 208 can obtain pairs of the hash values and the corresponding index values. In some aspects, the hash aggregation component 208 can obtain pairs of the hash values at a selected index value in each of the generated hashes. For example, in aspects in which a hash is generated for an original version of media and another hash is generated for a vertically flipped version of the media, the hash aggregation component 208 can extract the hash values (and, in some aspects, the index values) for the two hash values located at the selected index value.

In some aspects, the index values can be included as an explicit portion of the hash value. For example, the index value (or information representative of the index value) can be appended to and/or concatenated with the hash value (or information representative of the hash value). In other aspects, the index value (or information representative of the index value) can be associated with the corresponding hash value while not explicitly added, appended and/or concatenated to the hash value (or information representative of the hash value).

In various aspects, in order to compute a flip-resistant fingerprint, information indicative of whether a hash and/or hash value within a hash was received from a particular orientation of the media can be ignored and/or not utilized in the computations of the FRFGC 112'. For example, in various aspects, information indicative of a first hash being associated with and/or computed from a vertically flipped orientation of media can be excluded, ignored and/or not utilized by the FRFGC 112' such that the final hash computed is blind to the orientations employed to generate the fingerprint. In some aspects, information indicative of a version from which a hash was generated can be preserved but excluded from the calculation of the flip-resistant fingerprint.

The SHGC 210 can compute a final hash based on hashing the sets of hashes generated from the versions of the media. In various aspects, the SHGC 210 can compute the final hash based on hashing the pairs of hash values and index values obtained by the hash aggregation component 208 (and/or hashing the hash values at the selected index value, as obtained by the hash aggregation component 208). The SHGC 210 can generate the flip-resistant fingerprint based on the final hash.

Microprocessor 214 can perform one or more of the functions described in this disclosure with reference to any of the systems and/or methods disclosed.

The memory 216 can be a computer-readable storage medium storing computer-executable instructions and/or information for performing the functions described in this disclosure with reference to any of the systems and/or methods disclosed. For example, as shown, memory 216 can store computer-executable instructions in some aspects, for performing the functions of the FRFGC 112'.

While aspects including FRFGC 112' (in place of FRFGC 112 in the system 100) can include memories 110, 216 and microprocessors 108, 214, in various aspects, only one memory and/or only one microprocessor need be included in system 100.

In some aspects of systems described in this disclosure, the media frame component 200, media orientation component 202, the FHGC 204, hash aggregation component 208, hash augmentation 206, SHGC 210, microprocessor 214 and/or memory 216 can be as described above with reference to FIG. 2. In some aspects, the hash aggregation component 208 can also determine a selected index value and/or obtain a group of hash values in the set of hashes that corresponds to the selected index value. For example, the hash aggregation component 208 can obtain a group of two or more hash values corresponding to the same index value in different hashes.

In these aspects, the SHGC 210 can compute a final hash based, at least, on hashing the group of hash values. In some aspects, the SHGC 210 can also generate a flip-resistant fingerprint based, at least, on the final hash.

In some aspects, the flip-resistant fingerprint can be the same as the final hash generated by the SHGC 210. As such, after the SHGC 210 computes the final hash based, at least, on hashing the group of hash values, no additional flip-resistant fingerprint need be generated. Instead, the flip-resistant fingerprint can be equal to the final hash.

In some aspects, the FRFGC 112' can also include sorting component 212. The sorting component 212 can determine information corresponding to one or more positions of the one or more hash values. The sorting component 212 can then generate sorted sets of hashes. The hashes can be sorted any number of ways, including, but not limited to, in numerical order, lexicographically (for hashes represented as strings) or the like.

In some aspects, the sorted sets of hashes are based, at least, on sorting the one or more hash values located at one or more positions within the hash. The one or more positions can be selected based on any number of different criteria.

In some aspects of systems that employ a media frame component 200, media orientation component 202, FHGC 204, hash aggregation component 208, hash augmentation 206, SHGC 210, sorting component 212, microprocessor 214 and/or memory 216 can be as described above with reference to FIG. 2. In some aspects, the hash aggregation component 208 can also determine a selected index value and/or obtain a group of hash values in the sorted set of hashes that corresponds to the selected index value. For example, the hash aggregation component 208 can obtain a group of two or more sorted hash values corresponding to the same index value in different hashes.

In various aspects, the systems and methods described in this disclosure can be employed to determine whether received two segments of media match one another. For example, a method can include receiving first media (e.g., using the communication component 104), comparing a flip-resistant fingerprint for a first media with a fingerprint for a second media (e.g., using the MFC 106) and/or determining whether the first media matches the second media based, at least, on the comparing (e.g., using the MFC 106).

Figure 3:
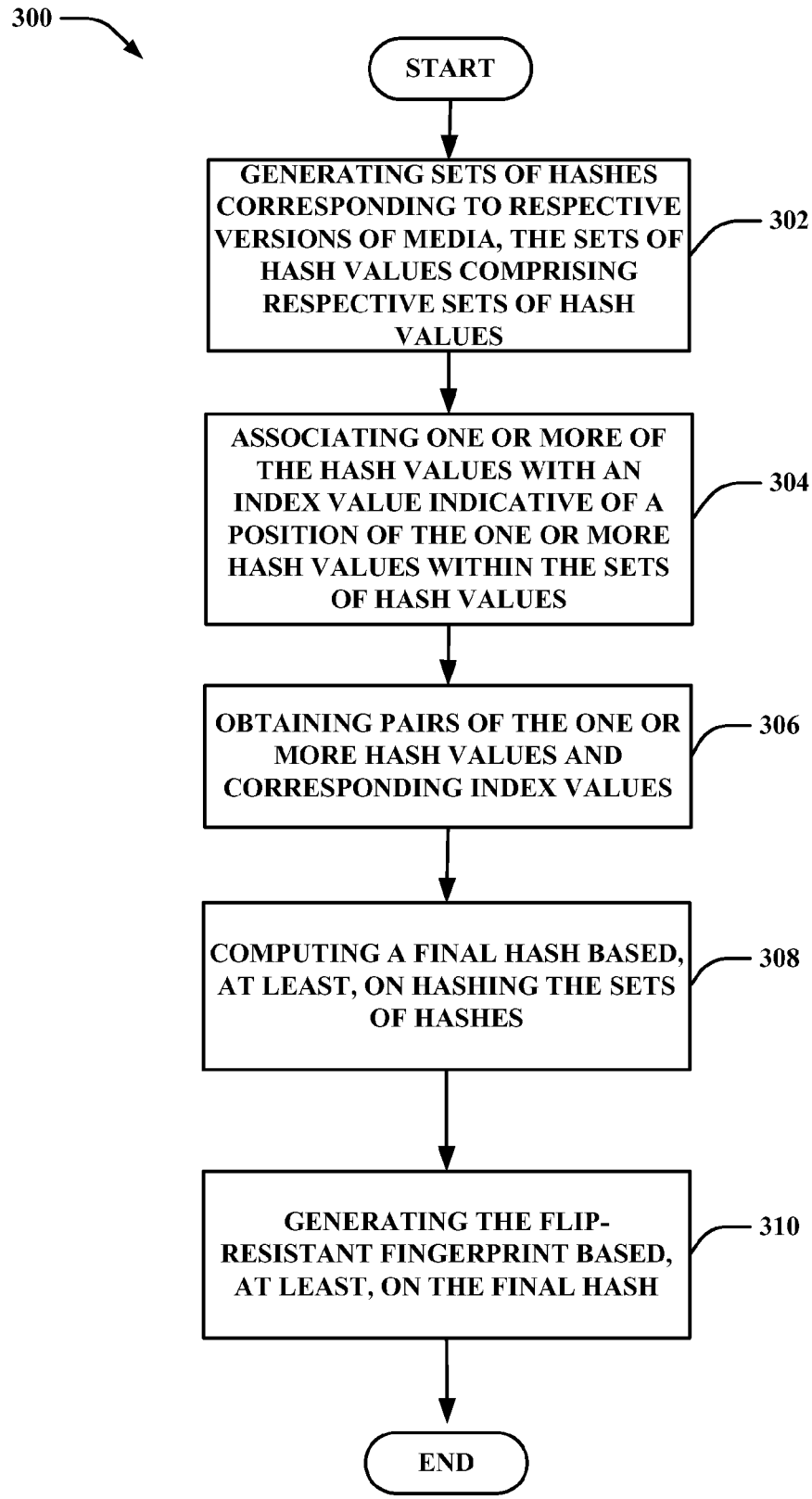
FIGS. 3, 4 and 5 are illustrations of exemplary flow diagrams of methods that facilitate flip-resistant media fingerprinting in accordance with one or more aspects described herein.
Figure 4:
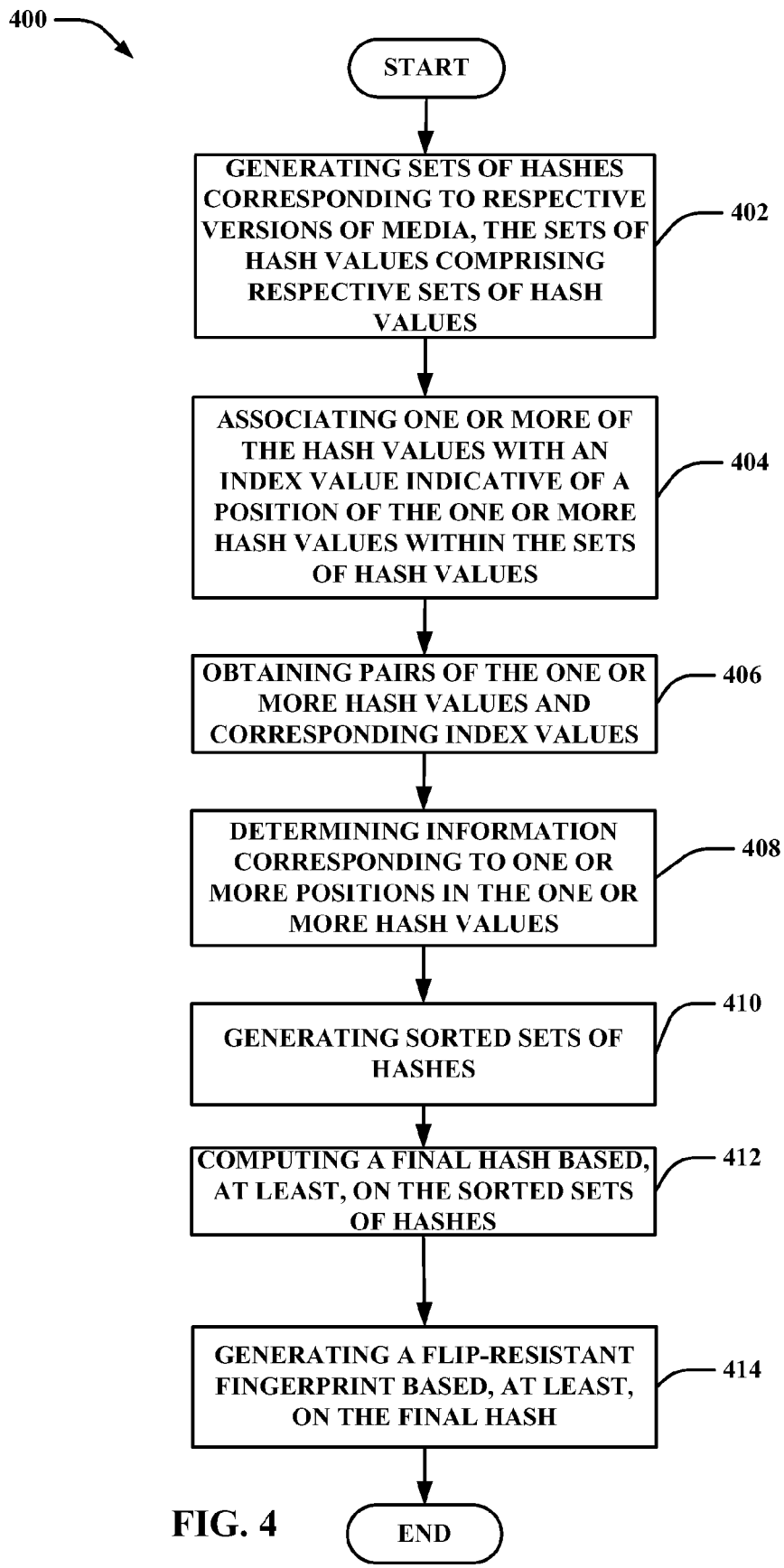
Figure 5:
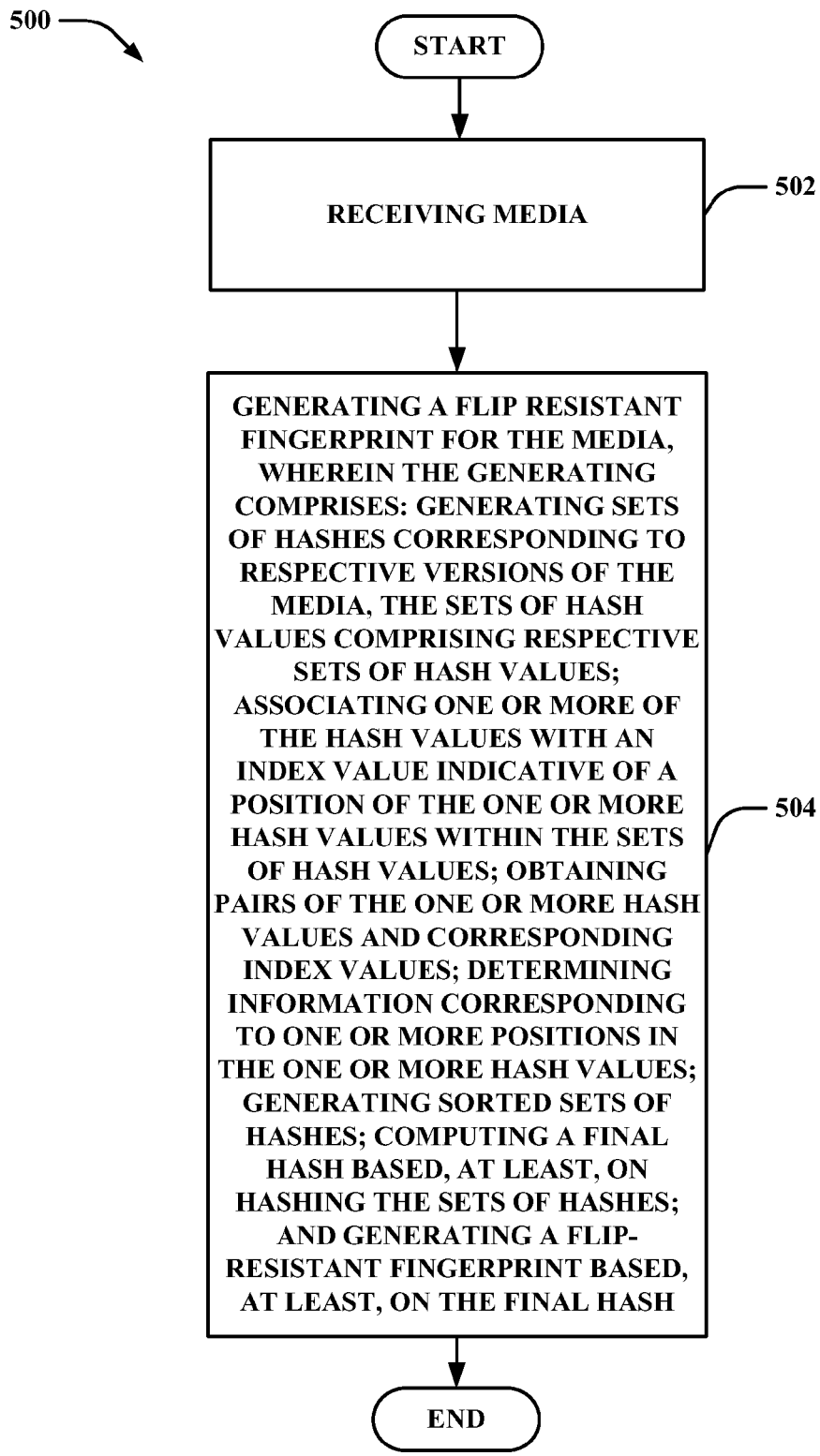

FIGS. 3, 4 and 5 are illustrations of exemplary flow diagrams of methods that facilitate flip-resistant media fingerprinting in accordance with aspects described herein.

Turning first to FIG. 3, FIG. 3 is a method of generating a flip-resistant media fingerprint in accordance with one or more aspects described herein. At 302, method 300 can include generating sets of hashes corresponding to respective versions of media (e.g., using the FHGC 204). The sets of hash values can include respective sets of hash values. In some aspects, the versions of the media can be associated with respective orientations of the media. The orientations of the media can include an original version of the media and at least one of a: vertically flipped version of the original version, a horizontally flipped version of the original version, a vertically and horizontally flipped version of the original version and/or a diagonally flipped version of the original version. In various aspects, a vertically and horizontally flipped version can be first vertically and then horizontally flipped or first horizontally and then vertically flipped.

At 304, method 300 can include associating one or more of the hash values with an index value indicative of a position of the one or more hash values within the sets of hash values (e.g., using the hash augmentation component 206). In some aspects, associating one or more of the hash values with an index value indicative of a position of the one or more hash values within the sets of hash values can include augmenting the one or more hash values with information indicative of the index value.

At 306, method 300 can include obtaining pairs of the one or more hash values and corresponding index values (e.g., using the hash aggregation component 208).

At 308, method 300 can include computing a final hash based, at least, on hashing the sets of hashes (e.g., using the SHGC 210).

At 310, method 300 can include generating a flip-resistant fingerprint based, at least, on the final hash (e.g., using the SHGC 210).

While the aspect described with reference to method 300 includes act 310, in some aspects, act 310 is unnecessary and not performed. For example, in some aspects, the flip-resistant fingerprint can be the same as the final hash. As such, no additional flip-resistant fingerprint need be generated after computing the final hash in act 308.

Turning now to FIG. 4, FIG. 4 is a method of generating a flip-resistant media fingerprint employing sorting in accordance with one or more aspects described herein.

At 402, method 400 can include generating sets of hashes corresponding to respective versions of media (e.g., using the FHGC 204). The sets of hash values can include respective sets of hash values.

In some aspects, the versions of the media can be associated with respective orientations of the media. The orientations of the media can include an original version of the media and at least one of a: vertically flipped version of the original version, a horizontally flipped version of the original version, a vertically and horizontally flipped version of the original version and/or a diagonally flipped version of the original version.

At 404, method 400 can include associating one or more of the hash values with an index value indicative of a position of the one or more hash values within the sets of hash values (e.g., using the hash augmentation component 206). In some aspects, associating one or more of the hash values with an index value indicative of a position of the one or more hash values within the sets of hash values can include augmenting the one or more hash values with information indicative of the index value.

At 406, method 400 can include obtaining pairs of the one or more hash values and corresponding index values (e.g., using the hash aggregation component 208).

At 408, method 400 can include determining information corresponding to one or more index values in the one or more hash values (e.g., using the sorting component 212). The information can be the hash values corresponding to the index values (e.g., an index value 2 can represent the second hash value in the hash).

At 410, method 400 can include generating sorted sets of hashes (e.g., using the sorting component 212). In some aspects, the sorted sets of hashes are based, at least, on sorting the one or more hash values located at the one or more index values corresponding to the information.

At 412, method 400 can include computing a final hash based, at least, on the sorted sets of hashes (e.g., using the SHGC 210). In some aspects, the final hash can be based on hashing the sorted sets of hash values. In some aspects, the final hash can be based on the sorted hashes (without further hashing the sorted hashes). At 414, method 400 can include generating the flip-resistant fingerprint based, at least, on the final hash (e.g., using the SHGC 210).

While the aspect described with reference to method 400 includes act 414, in some aspects, act 414 is unnecessary and not performed. For example, in some aspects, the flip-resistant fingerprint can be the same as the final hash. As such, no additional flip-resistant fingerprint need be generated after computing the final hash in act 412.

Turning now to FIG. 5, FIG. 5 is a method of generating a flip-resistant media fingerprint in accordance with one or more aspects described herein. At 502, method 500 can include receiving media (e.g., using the communication component 104). In some aspects, method 500 can include generating a frame of the media (e.g., using the media frame component 200). Also, in some aspects (although not shown), method 500 can include generating various orientations of the received media (e.g., using the media orientation component 202).

At 504, method 500 can include generating a flip-resistant fingerprint, wherein the generating includes: generating sets of hashes corresponding to respective versions of the media, the sets of hash values including respective sets of hash values (e.g., using the FHGC 204) and associating one or more of the hash values with an index value indicative of a position of the one or more hash values within the respective sets of hash values (e.g., using the hash augmentation component 206). In some aspects, generating the fingerprint can also include: obtaining pairs of the one or more hash values and corresponding index values (e.g., using the hash aggregation component 208); and computing a final hash based, at least, on hashing the sets of hashes (e.g., using the SGHC 210). Generating the fingerprint can also include generating the flip-resistant fingerprint based, at least, on the final hash (e.g., using the SGHC 210).

Exemplary Networked and Distributed Environments

One of ordinary skill in the art can appreciate that the various aspects described in this disclosure can be implemented in connection with any computer or other client or server device, which can be deployed as part of a computer network or in a distributed computing environment, and can be connected to any kind of data store where media may be found. In this regard, the various aspects described in this disclosure can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various aspects of this disclosure.

Figure 6:
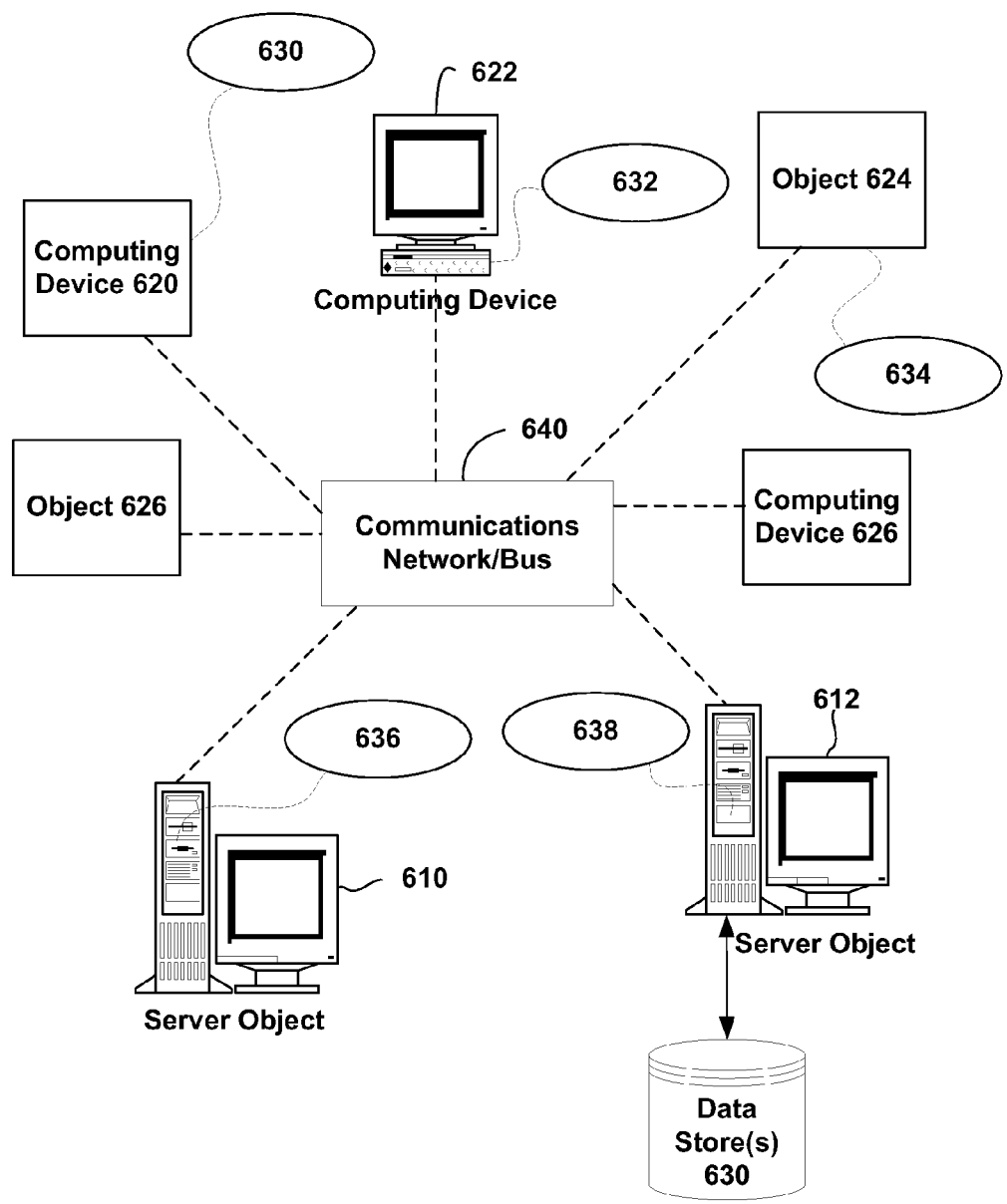
FIG. 6 is an illustration of a schematic diagram of an exemplary networked or distributed computing environment for implementing one or more aspects described in this disclosure.

FIG. 6 provides a schematic diagram of an exemplary networked or distributed computing environment in which aspects described in this disclosure can be implemented. The distributed computing environment includes computing objects 610, 612, etc. and computing objects or devices 620, 622, 624, 626, 628, etc., which can include programs, methods, data stores, programmable logic, etc., as represented by applications 630, 632, 634, 636, 638. It can be appreciated that computing objects 610, 612, etc. and computing objects or devices 620, 622, 624, 626, 628, etc. can include different devices, such as personal digital assistants (PDAs), audio/media devices, mobile phones, MPEG-1 Audio Layer 3 (MP3) players, personal computers, laptops, tablets, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, network 640 can include other computing objects and computing devices that provide services to the system of FIG. 6, and/or can represent multiple interconnected networks, which are not shown. Each computing object 610, 612, etc. or computing objects or devices 620, 622, 624, 626, 628, etc. can also contain an application, such as applications 630, 632, 634, 636, 638, that might make use of an API, or other object, software, firmware and/or hardware, suitable for communication with or aspect of the various aspects of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various aspects.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc. provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances. Any of these computing devices can process data, or request transaction services or tasks that can implicate the techniques for systems as described in this disclosure for one or more aspects.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described in this disclosure can be provided standalone, or distributed across multiple computing devices or objects.

In a network environment in which the communications network/bus 640 can be the Internet, for example, the computing objects 610, 612, etc. can be Web servers, file servers, media servers, etc. with which the client computing objects or devices 620, 622, 624, 626, 628, etc. communicate via any of a number of known protocols, such as the hypertext transfer protocol (HTTP). Objects 610, 612, etc. can also serve as client computing objects or devices 620, 622, 624, 626, 628, etc., as can be characteristic of a distributed computing environment.

Exemplary Computing Device

Figure 7:
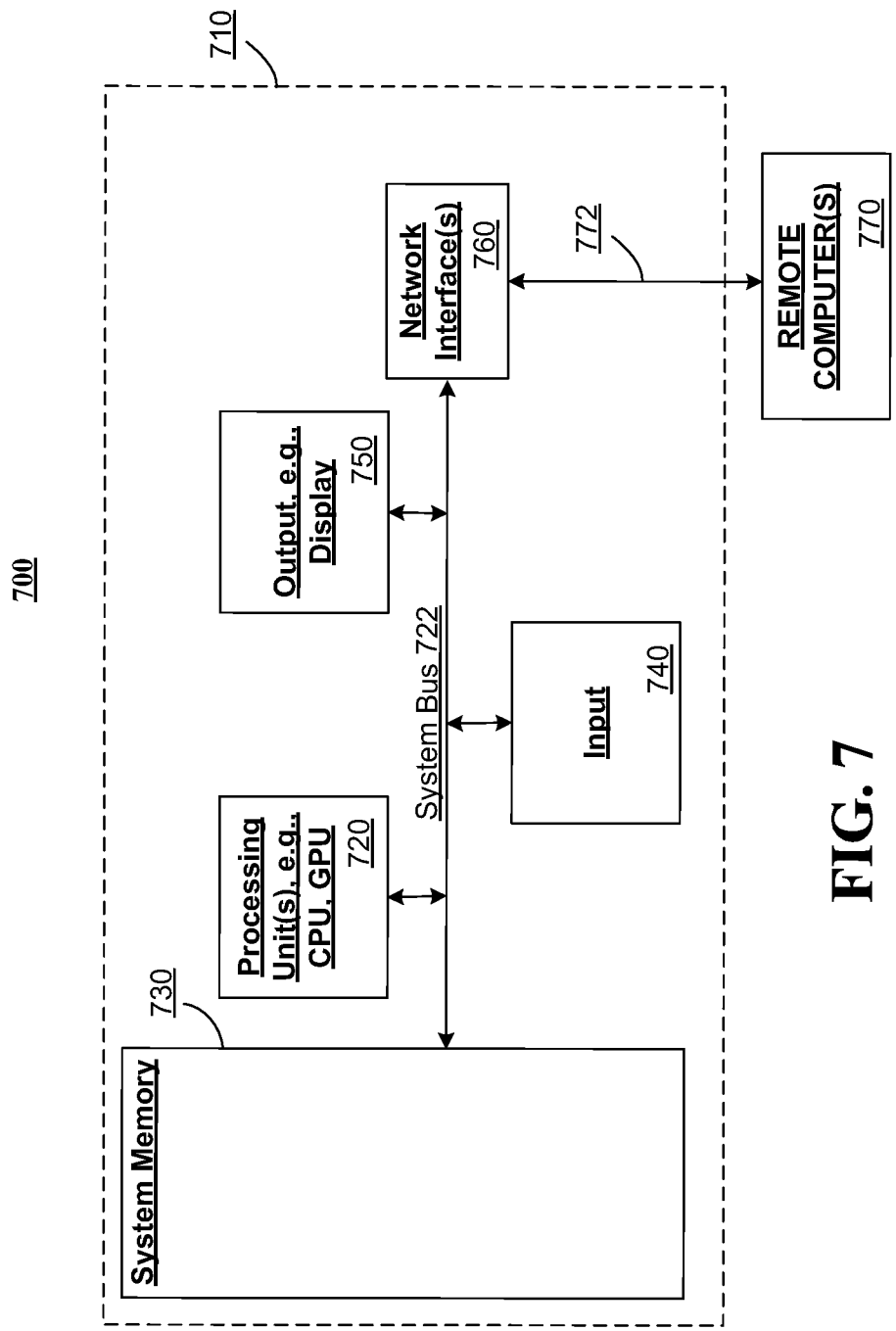
FIG. 7 is an illustration of a schematic diagram of an exemplary computing environment for implementing one or more aspects described in this disclosure.

As mentioned, advantageously, the techniques described in this disclosure can be applied to any suitable device. It is to be understood, therefore, that handheld, portable and other computing devices and computing objects of all kinds are contemplated for use in connection with the various aspects, i.e., anywhere that a device may wish to read or write transactions from or to a data store. Accordingly, the below computer described below in FIG. 7 is but one example of a computing device. Additionally, a suitable server can include one or more aspects of the below computer, such as a media server or other media management server components.

Although not required, aspects can be partly implemented via an operating system, for use by a developer of services for a device or object, and/or included within application software that operates to perform one or more functional aspects of the various aspects described in this disclosure. Software can be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 7 thus illustrates an example of a suitable computing system environment 700 in which one or aspects of the aspects described in this disclosure can be implemented, although as made clear above, the computing system environment 700 is only one example of a suitable computing environment and is not intended to suggest any limitation as to scope of use or functionality. Neither is the computing environment 700 to be interpreted as having any dependency or requirement relating to any one or combination of components illustrated in the exemplary computing environment 700.

With reference to FIG. 7, an exemplary computing environment 700 for implementing one or more aspects includes a computing device in the form of a computer 710 is provided. Components of computer 710 can include, but are not limited to, a processing unit 720, a system memory 730, and a system bus 722 that couples various system components including the system memory to the processing unit 720.

Computer 710 typically includes a variety of computer readable mediums and can be any available mediums that can be accessed by computer 710. The system memory 730 can include computer storage mediums in the form of volatile and/or nonvolatile memory such as read only memory (ROM) and/or random access memory (RAM). By way of example, and not limitation, memory 730 can also include an operating system, application programs, other program modules, and program data.

A user can enter commands and information into the computer 710 through input devices 740, non-limiting examples of which can include a keyboard, keypad, a pointing device, a mouse, stylus, touchpad, touch screen, trackball, motion detector, camera, microphone, joystick, game pad, scanner, media camera or any other device that allows the user to interact with the computer 710. A monitor or other type of display device can be also connected to the system bus 722 via an interface, such as output interface 750. In addition to a monitor, computers can also include other peripheral output devices such as speakers and a printer, which can be connected through output interface 750.

The computer 710 can operate in a networked or distributed environment using logical connections to one or more other remote computers, such as remote computer 780. The remote computer 780 can be a personal computer, a server, a router, a network PC, a peer device or other common network node, or any other remote media consumption or transmission device, and can include any or all of the elements described above relative to the computer 710. The logical connections depicted in FIG. 7 include a network 782, such local area network (LAN) or a wide area network (WAN), but can also include other networks/buses e.g., cellular networks.

As mentioned above, while exemplary aspects have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed herein. Thus, aspects herein are contemplated from the standpoint of an API (or other software object), as well as from a software or hardware object that implements one or more aspects described in this disclosure. Thus, various aspects described in this disclosure can have aspects that are wholly in hardware, partly in hardware and partly in software, as well as in software.

Computing devices typically include a variety of mediums, which can include computer-readable storage mediums and/or communications mediums, in which these two terms are used herein differently from one another as follows. Computer-readable storage mediums can be any available storage mediums that can be accessed by the computer, can be typically of a non-transitory nature, and can include both volatile and nonvolatile mediums, removable and non-removable mediums. By way of example, and not limitation, computer-readable storage mediums can be implemented in connection with any method or technology for storage of information such as computer-readable instructions, program modules, structured data, or unstructured data. Computer-readable storage mediums can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory mediums which can be used to store desired information. Computer-readable storage mediums can be accessed by one or more local or remote computing devices, e.g., via access requests, queries or other data retrieval protocols, for a variety of operations with respect to the information stored by the medium.

On the other hand, communications mediums typically embody computer-readable instructions, data structures, program modules or other structured or unstructured data in a data signal such as a modulated data signal, e.g., a carrier wave or other transport mechanism, and includes any information delivery or transport mediums. The term "modulated data signal" or signals refers to a signal that has one or more of its characteristics set or changed in such a manner as to encode information in one or more signals. By way of example, and not limitation, communication mediums include wired mediums, such as a wired network or direct-wired connection, and wireless mediums such as acoustic, radio frequency (RF), infrared and other wireless mediums.

It is to be understood that the aspects described in this disclosure can be implemented in hardware, software, firmware, middleware, microcode, or any combination thereof. For a hardware aspect, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described in this disclosure, or a combination thereof.

When the aspects are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software aspect, the techniques described in this disclosure can be implemented with modules or components (e.g., procedures, functions, and so on) that perform the functions described in this disclosure. The software codes can be stored in memory units and executed by processors. A memory unit can be implemented within the processor or external to the processor, in which case it can be communicatively coupled to the processor via various structures.

The word "exemplary" is used herein to mean serving as an example, instance, or illustration. For the avoidance of doubt, the subject matter disclosed herein is not limited by such examples. In addition, any aspect or design described in this disclosure as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Moreover, use of the term "an aspect" or "one aspect" throughout is not intended to mean the same aspect unless specifically described as such. Further, use of the term "plurality" can mean two or more.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components can be combined into a single component providing aggregate functionality or divided into several separate sub-components, and that any one or more middle layers, such as a management layer, can be provided to communicatively couple to such sub-components in order to provide integrated functionality. Any components described in this disclosure can also interact with one or more other components not specifically described in this disclosure but generally known by those of skill in the art.

In view of the exemplary systems described above methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks can occur in different orders and/or concurrently with other blocks from what is depicted and described in this disclosure. Where non-sequential, or branched, flow is illustrated via flowchart, it can be appreciated that various other branches, flow paths, and orders of the blocks, can be implemented which achieve the same or a similar result. Moreover, not all illustrated blocks can be required to implement the methodologies described in this disclosure after.

In addition to the various aspects described in this disclosure, it is to be understood that other similar aspects can be used or modifications and additions can be made to the described aspect(s) for performing the same or equivalent function of the corresponding aspect(s) without deviating there from. Still further, multiple processing chips or multiple devices can share the performance of one or more functions described in this disclosure, and similarly, storage can be provided across a plurality of devices. The invention is not to be limited to any single aspect, but rather can be construed in breadth, spirit and scope in accordance with the appended claims.

What is claimed is:

1. A system that facilitates fingerprinting of media, comprising:
 a memory that stores computer executable components; and
 a microprocessor that executes the following computer executable components stored in the memory:
 a communication component that receives the media; and
 a media fingerprinting component that fingerprints the media, the media fingerprinting component employing a flip-resistant fingerprint generation component stored in the memory and comprising:

a first hash generation component that generates sets of hashes corresponding to respective versions of the media, by hashing the respective orientations of an original version of the media, wherein hashing the respective orientations of the original version of the media comprising hashing an original version of the media and hashing a diagonally flipped version of the original version of the media and obtaining the sets of hashes comprising respective sets of hash values and a second hash generation component that:

computes a final hash based, at least, on hashing the sets of hashes; and generates a flip-resistant fingerprint based, at least, on the final hash.

2. The system of claim 1, further comprising:

a hash augmentation component that associates one or more of the hash values with an index value indicative of a position of the one or more hash values within the respective sets of hash values; and a hash aggregation component that obtains pairs of the one or more hash values and corresponding index values.

3. The system of claim 2, wherein the hash augmentation component associates the one or more hash values with the index value indicative of the position of the one or more hash values within the respective sets of hash values by augmenting the one or more hash values with information indicative of the index value.

4. The system of claim 1, wherein the respective sets of hash values correspond to content of the media.

5. The system of claim 1, wherein the orientations of the media further comprise at least one of a: vertically flipped version of the original version, a horizontally flipped version of the original version, or a vertically and horizontally flipped version of the original version.

6. A system that facilitates fingerprinting of media, comprising:

a memory that stores computer executable components; and a microprocessor that executes the following computer executable components stored in the memory:

a media fingerprinting component that fingerprints media, the media fingerprinting component employing a flip-resistant fingerprint generation component stored in the memory and comprising:

a first hash generation component that generates sets of hashes corresponding to respective versions of the media, by hashing the respective orientation of an original version of the media, wherein hashing the respective orientations of the original version of the media comprising hashing an original version of the media and hashing a diagonally flipped version of the original version of the media and obtaining the sets of hashes comprising respective sets of hash values, and a second hash generation component that:

computes a final hash based, at least, on hashing the group of hash values; and generates a flip-resistant fingerprint based, at least, on the final hash.

7. The system of claim 6, further comprising:

a hash augmentation component that associates one or more of the hash values with an index value indicative of a position of the one or more hash values within the respective sets of hash values; and a hash aggregation component that:

obtains pairs of the one or more hash values and corresponding index values;

determines a selected index value; and obtains a group of hash values in the set of hashes that corresponds to the selected index value.

8. The system of claim 7, wherein the hash augmentation component associates the one or more hash values with the index value indicative of the position of the one or more hash values within the respective sets of hash values by augmenting the one or more hash values with information indicative of the index value.

9. A method, comprising:

employing a microprocessor to execute computer executable components stored within a memory to perform the following:

generating sets of hashes corresponding to respective versions of media, by hashing the respective orientations of an original version of the media, wherein hashing the respective orientations of the original version of the media comprising hashing an original version of the media and hashing a diagonally flipped version of the original version of the media and obtaining the sets of hashes comprising respective sets of hash values, computing a final hash based, at least, on hashing the sets of hashes; and generating a flip-resistant fingerprint based, at least, on the final hash.

10. The method of claim 9, further comprising:

associating one or more of the hash values with an index value indicative of a position of the one or more hash values within the respective sets of hash values; and obtaining pairs of the one or more hash values and corresponding index values.

11. The method of claim 10, wherein the associating the one or more hash values with the index value indicative of the position of the one or more hash values within the respective sets of hash values comprises augmenting the one or more hash values with information indicative of the index value.

12. The method of claim 9, wherein the respective sets of hash values correspond to content of the media.

13. The method of claim 1, wherein the orientations of the media further comprise at least one of a: vertically flipped version of the original version, a horizontally flipped version of the original version, or a vertically and horizontally flipped version of the original version.

14. A method, comprising:

employing a microprocessor to execute computer executable components stored within a memory to perform the following:

generating sets of hashes corresponding to respective versions of the media, by hashing an respective orientations of an original version of the media, wherein hashing an respective orientations of the original version of the media comprising hashing an original version of the media and hashing a diagonally flipped version of the original version of the media and obtaining the sets of hashes comprising respective sets of hash value, determining a selected index value;

obtaining a group of hash values in the set of hashes that corresponds to the selected index value;

computing a final hash based, at least, on hashing the group of hash values; and generating a flip-resistant fingerprint based, at least, on the final hash.

15. The method of claim 14, further comprising:

associating one or more of the hash values with an index value indicative of a position of the one or more hash values within the respective sets of hash values; and obtaining pairs of the one or more hash values and corresponding index values.

16. The method of claim 14, wherein the orientations of the media further comprise at least one of a: vertically flipped version of the original version, a horizontally flipped version of the original version, a vertically and horizontally flipped version of the original version, or a diagonally flipped version of the original version.

17. A system that facilitates fingerprinting of media, comprising:
   a memory that stores computer executable components; and
   a microprocessor that executes the following computer executable components stored in the memory:
      a communication component that receives the media; and
      a media fingerprinting component that fingerprints the media, the media fingerprinting component employing a flip-resistant fingerprint generation component stored in the memory and comprising:
         a first hash generation component that generates sets of hashes corresponding to respective versions of the media, by hashing the respective orientations of an original version of the media, wherein hashing the respective orientations of the original version of the media comprising hashing an original version of the media and hashing a diagonally flipped version of the original version of the media and obtaining the sets of hashes comprising respective sets of hash values, a sorting component that:
            determines information corresponding to one or more index values of the one or more hash values; and
            generates sorted sets of hashes; and a second hash generation component that:
            computes a final hash based, at least, on the sorted sets of hashes; and
            generates a flip-resistant fingerprint based, at least, on the final hash.

18. The system of claim 17, further comprising:
a hash augmentation component that associates one or more of the hash values with an index value indicative of a position of the one or more hash values within the respective sets of hash values; and
a hash aggregation component that obtains pairs of the one or more hash values and corresponding index values.

19. The system of claim 17, wherein the sorted sets of hashes are based, at least, on sorting the one or more hash values located at the one or more index values corresponding to the information.

20. The system of claim 17, wherein the respective sets of hash values correspond to content of the media.

21. The system of claim 1, wherein the orientations of the media further comprise an original version of the media and at least one of a: vertically flipped version of the original version, a horizontally flipped version of the original version, or a vertically and horizontally flipped version of the original version.

22. A method, comprising:
   employing a microprocessor to execute computer executable components stored within a memory to perform the following:
      receiving media; and
      generating a flip resistant fingerprint for the media, wherein the generating comprises:
         generating sets of hashes corresponding to respective versions of the media, by hashing the respective orientations of an original version of the media, wherein hashing the respective orientations of the original version of the media comprising hashing an original version of the media and hashing a diagonally flipped version of the original version of the media and obtaining the sets of hashes comprising respective sets of hash values, determining information corresponding to one or more positions of the one or more hash values;
         generating sorted sets of hashes based, at least, on sorting the one or more hash values located at the one or more positions corresponding to the information;
         computing a final hash based, at least, on the sorted sets of hashes; and
         generating a flip-resistant fingerprint based, at least, on the final hash.

23. The method of claim 22, further comprising:
associating one or more of the hash values with an index value indicative of a position of the one or more hash values within the respective sets of hash values; and
obtaining pairs of the one or more hash values and corresponding index values.

* * * * *